Patented Mar. 16, 1943

2,313,799

UNITED STATES PATENT OFFICE 2,313,799

COATING COMPOSITION

James B. Bullitt, Jr., Swarthmore, Peter B. Evans, Wynnewood, and Horace H. Hopkins, Swarthmore, Pa., assignors to E. I. du Pont de Nemours & Company, Wilmington, Del., a corporation of Delaware No Drawing. Application August 27, 1940, Serial No. 354,382

6 Claims. (Cl. 260—22)

This invention relates to decorative and protective coating compositions and more particularly to such coating compositions having a resinous vehicle as a base.

In the manufacture of air drying alkyd resin enamels it is a common practice to use drying oil or semi-drying oil or oil acid modified polyhydric alcohol-polycarboxylic acid resins as the sole or principle resin vehicle. These resins as commonly prepared are considered as high acid number resins, the acid number averaging between 30 and 40 and often being considerably above 40. Enamels prepared from such resins frequently do not exhibit a uniform retention of drying properties on storage and may thus become unreliable so far as the results desired in the practical application thereof is concerned. A black air drying enamel, for example, when freshly prepared may dry satisfactorily in four hours but after container storage under normal conditions may not dry satisfactorily in ten hours.

This loss of drying ability of the enamels is not uniform and further not absolutely reproducible which adds to the complexity of the problem. The use of an extra quantity of metallic drier in the enamel as initially prepared is ineffective in assuring a maintenance of uniform drying of such enamels on storage. Furthermore, there are marked limitations on the amount of metallic drier which can be used without jeopardizing other desirable and necessary properties of the enamels.

This invention has as a principal object the provision of means for preparing synthetic resin enamels having satisfactory initial air drying properties and retaining these properties on storage. A further object is the provision of means for preparing such enamels in which drying oil, semi-drying oil or oil acid modified polyhydric alcohol-polycarboxylic acid resins make up the principal vehicle. A still further object is the manufacture of such enamels possessing the retention of satisfactory drying properties while maintaining the other necessary and desirable properties of the enamel as build, gloss, etc.

Other objects will be apparent as the description of the invention proceeds.

These objects are accomplished in the present invention by incorporating into the enamel composition a small percentage of an organic oxide as exemplified by material of the type of cyclohexene oxide, isobutylene oxide, pentene oxide and hexene oxide.

The invention will be more fully understood from the following examples which are given by way of illustration but not by limitation except insofar as defined by the appended claims. The parts are by weight.

EXAMPLE I

Black enamel

| | Parts |
|---|---|
| Carbon black pigment | 2.1 |
| Iron blue pigment | .7 |
| Alkyd resin | 33.6 |
| Lead naphthenate drier | 1.7 |
| Manganese naphthenate drier | 1.3 |
| Cobalt naphthenate drier | 2.9 |
| Hydrocarbon solvents | 56.0 |
| Cyclohexene oxide | 1.7 |

The alkyd resin used in this example was a modified polyhydric alcohol-polycarboxylic acid resin and more specifically was a 50% linseed-China-wood oil modified glyceryl phthalate resin, the linseed and China-wood oil being present in the ratio of 3:1.

The lead, manganese and cobalt driers were solutions in mineral spirits containing 16%, 3% and 2% metal, respectively.

The hydrocarbon solvents may be of the aliphatic or aromatic petroleum type or of the coal tar type or mixtures thereof.

The enamel may be conveniently prepared by dispersing the pigments in a ball mill or other suitable equipment in a portion of the resin and hydrocarbon solvent and then adding the remainder of the resin, solvents, and other ingredients including the cyclohexene oxide to the pigment dispersion thus obtained and thoroughly agitating.

Other procedures for preparing synthetic resin enamels well known in the industry will be readily apparent to those skilled in the art.

This enamel when applied e. g. by spraying to a suitably prepared metal surface air dries satisfactorily in four hours. The same enamel containing no cyclohexene oxide air dries in approximately six hours. It will thus be seen that the presence of the cyclohexene oxide in the enamel reduces appreciably the initial drying time. The enamel of the example after normal storage for approximately three months at room temperature in a closed container was found to air dry in approximately four and one-half hours, whereas the enamel containing no cyclohexene oxide required nine hours to dry thus showing an appreciable increase in drying time on storage.

It is thus evident that the presence of the cyclohexene oxide in the enamel composition decreases both the initial drying time and substantially stabilizes the enamel as to drying after normal storage.

A similar enamel in which isobutylene oxide was used in the amount of 1.7% in place of the cyclohexene oxide yielded similar results both as to reduced initial drying time and retention of drying properties on storage although used in this amount it was somewhat less effective than the cyclohexene oxide.

EXAMPLE II

Blue single pigment enamel

| | Parts |
|---|---|
| Iron blue pigment | 8.7 |
| Alkyd resin | 34.7 |
| Cobalt naphthenate drier | 1.9 |
| Hydrocarbon solvent | 52.2 |
| Cyclohexene oxide | 2.5 |

The alkyd resin in the above composition may be the same as used in Example I.

The drier solution was that as described under Example I as was also the hydrocarbon solvent. The enamel was also prepared as previously described.

The enamel applied to a suitably prepared surface air dried in four and one-half hours. The same enamel but containing no cyclohexene oxide required eight hours to dry satisfactorily. The cyclohexene oxide containing enamel after normal storage was found to air dry in five and one-half hours whereas the same enamel but containing no cyclohexene oxide required approximately ten hours to dry satisfactorily.

EXAMPLE III

Black enamel

| | Parts |
|---|---|
| Carbon black pigment | 2.6 |
| Alkyd resin | 35.8 |
| Lead naphthenate drier | .9 |
| Manganese naphthenate drier | 2.9 |
| Cobalt naphthenate drier | 1.8 |
| Hydrocarbon solvent | 51.5 |
| Cyclohexene oxide | 4.5 |

The alykd resin used in this composition was the same as used in the previous examples. The drier solutions were those as previously described as was also the hydrocarbon solvent. The enamel may be prepared by any convenient procedure known in the art or as described under Example I.

This enamel air dried initially in four hours and after container storage for approximately two months dried in four and one-half hours. The same composition but containing no cyclohexene oxide dried initially in eight hours but after approximately two months container storage required ten hours to dry satisfactorily.

EXAMPLE IV

White enamel

| | Parts |
|---|---|
| Titanium oxide pigment | 12.0 |
| Calcium base titanium oxide pigment | 18.3 |
| Alkyd resin | 26.0 |
| Rosin modified-maleic acid-glyceride resin | 6.6 |
| Cobalt naphthenate drier | 0.7 |
| Manganese naphthenate drier | 0.7 |
| Lead naphthenate drier | 0.7 |
| Monoacetate of monoethyl ether of ethylene glycol | 6.1 |
| Hydrocarbon solvent | 24.2 |
| Turpentine | 2.2 |
| Cyclohexene oxide | 2.5 |

The alkyd resin used in this composition was a 46% soya bean oil modified glyceryl phthalate. The driers used were those as described under Example I. The composition may be prepared as previously described or by any other prodecure familiar to those skilled in the art. The above formula yields material of so called "package" viscosity. Such material is usually diluted with suitable thinner as hydrocarbon solvent before being applied to a suitable surface to produce a decorative or protective coating. This enamel is particularly adapted for finishing wood surfaces.

This product exhibits the improved initial drying and substantial maintenance of drying time on storage as shown by the materials of the other examples.

While the examples show a black, a blue, and a white enamel, the invention is applicable to enamels of all colors, those containing either a single pigment or the so-called multi-pigmented enamels. The compositions as given in the examples represent material at package viscosity and are usually further diluted with suitable solvents before being applied as decorative and protective coatings. The organic oxides may also be used with air dry enamels which are prepared as to be of a viscosity immediately satisfactory for application. The enamels may be applied by any of the well known procedures as spraying, brushing, or dipping.

While the invention is concerned chiefly with pigmented compositions the organic oxides may be used in unpigmented or clear compositions, imparting thereto reduced initial drying time and the substantial retention of the initial drying properties on prolonged storage.

The organic oxide may be added at any stage of the preparation of the enamel. For example it may be added during the dispersion of the pigment or it may be added after all the other components of the enamel have been thoroughly mixed i. e., it may be added as the final component. While the examples show the use of 1.7, 2.5 and 4.5% of the organic oxide based on the total composition a range of from 0.5 to 7.5% has been found satisfactory with a preferred range of from 1 to 5%. Amounts less than the minimum of the above range are not effective practically and amounts greater than the maximum of the range are not desirable from an economic standpoint. While the examples note the use of cyclohexene oxide and isobutylene oxide, other organic oxides may also be used among which may be noted pentene and naphthene oxides.

Various types of semi-drying oil, drying oil or oil acid modified polyhydric alcohol-polycarboxylic acid resins may be used in the present invention. Among such modifying oils or oil acids may be noted soya bean, cottonseed, dehydrated castor oil, linseed, China-wood, perilla, and oiticica oil or the acids obtained therefrom. These resins are usually such as are modified to the extent of from 40% to 65%.

The compositions of the present invention are adaptable for use as decorative and protective coating compositions for application to various surfaces as wood, metal, glass, molded synthetic resin articles, hard rubber, etc. The compositions may be applied, as previously noted, by brushing, spraying, dipping, roller coating processes. etc. While adapted for general use the enamels are of special value in the refinishing of automotive vehicle bodies by the usual standard procedures.

It will be apparent from the above that synthetic resin coating compositions have been prepared which substantially retain their initial drying properties on storage and in addition possess improved initial drying properties, with respect to time, over alkyd resin coating compositions used in the present state of the art. These improved properties are imparted to the resin coating compositions without sacrifice of other desirable and necessary properties of the compositions as build, gloss, color, etc. Many other advantages will be apparent to those skilled in the art of preparing such compositions.

It is apparent that many widely different embodiments of this invention may be made without departing from the spirit and scope thereof, and therefore, it is not intended to be limited except as indicated in the appended claims.

We claim:

1. A coating composition comprising an alkyd resin modified with a compound having the acid radical of an oil having drying properties and an organic oxide selected from the class consisting of cyclohexene oxide, isobutylene oxide, naphthene oxide, pentene oxide, and hexene oxide, said oxide being present in amount between 0.5 and 7.5 per cent of the composition.

2. The composition of claim 1 in which the organic oxide is present in amount between about 1 and 5%.

3. A coating composition having approximately the following composition by weight:

| | Per cent |
|---|---|
| Pigment | 2.8 |
| Drying oil modified alkyd resin | 33.6 |
| Drier | 5.9 |
| Solvent | 56.0 |
| Cyclohexene oxide | 1.7 |

4. The composition of claim 1 in which the resin is modified with an oil acid.

5. The composition of claim 1 in which the resin is modified with a drying oil.

6. The composition of claim 1 in which the resin is modified with a semi-drying oil.

JAMES B. BULLITT, Jr.
PETER B. EVANS.
HORACE H. HOPKINS.